United States Patent [19]
Bamford

[11] 3,815,817
[45] June 11, 1974

[54] TUNDRA TRACK FOR A TRACKED VEHICLE
[75] Inventor: Michael A. T. Bamford, Calgary, Alberta, Canada
[73] Assignee: Flextrac Nodwell Ltd., Calgary, Alberta, Canada
[22] Filed: May 11, 1973
[21] Appl. No.: 359,520

[52] U.S. Cl. .............................. 238/10 R, 404/64
[51] Int. Cl. ............................................ E01b 23/00
[58] Field of Search ........ 238/14, 10 R, 1; 104/112; 404/32, 64, 65, 66, 68, 71

[56] References Cited
UNITED STATES PATENTS
2,384,395  9/1945  Payne ................................. 238/14
2,876,952  3/1959  Washabaugh ..................... 238/10 R
3,425,624  2/1969  Jacobs ................................. 238/14

Primary Examiner—Robert J. Spar
Assistant Examiner—Richard A. Bertsch
Attorney, Agent, or Firm—Fisher, Christen & Sabol

[57] ABSTRACT

A track particularly adapted for use on the tundra and arranged to avoid shearing the top and shallow layer of vegetation thereof; said track including a pair of endless belts, load distributing members replacing the conventional grouser bars on the outer side of the belts and secured on the inner side of the latter to maintain the conventional and required rigidity of the load transmitting members while allowing only shallow projections from the outer side of the belts such that the latter will bear the vehicle on soft ground while producing only shallow and non-destructive impressions into the latter, particularly on the tundra. On hard ground, shallow plates and or bolt heads against the outer side of the belts engage the ground and minimize wear of the belts.

9 Claims, 7 Drawing Figures

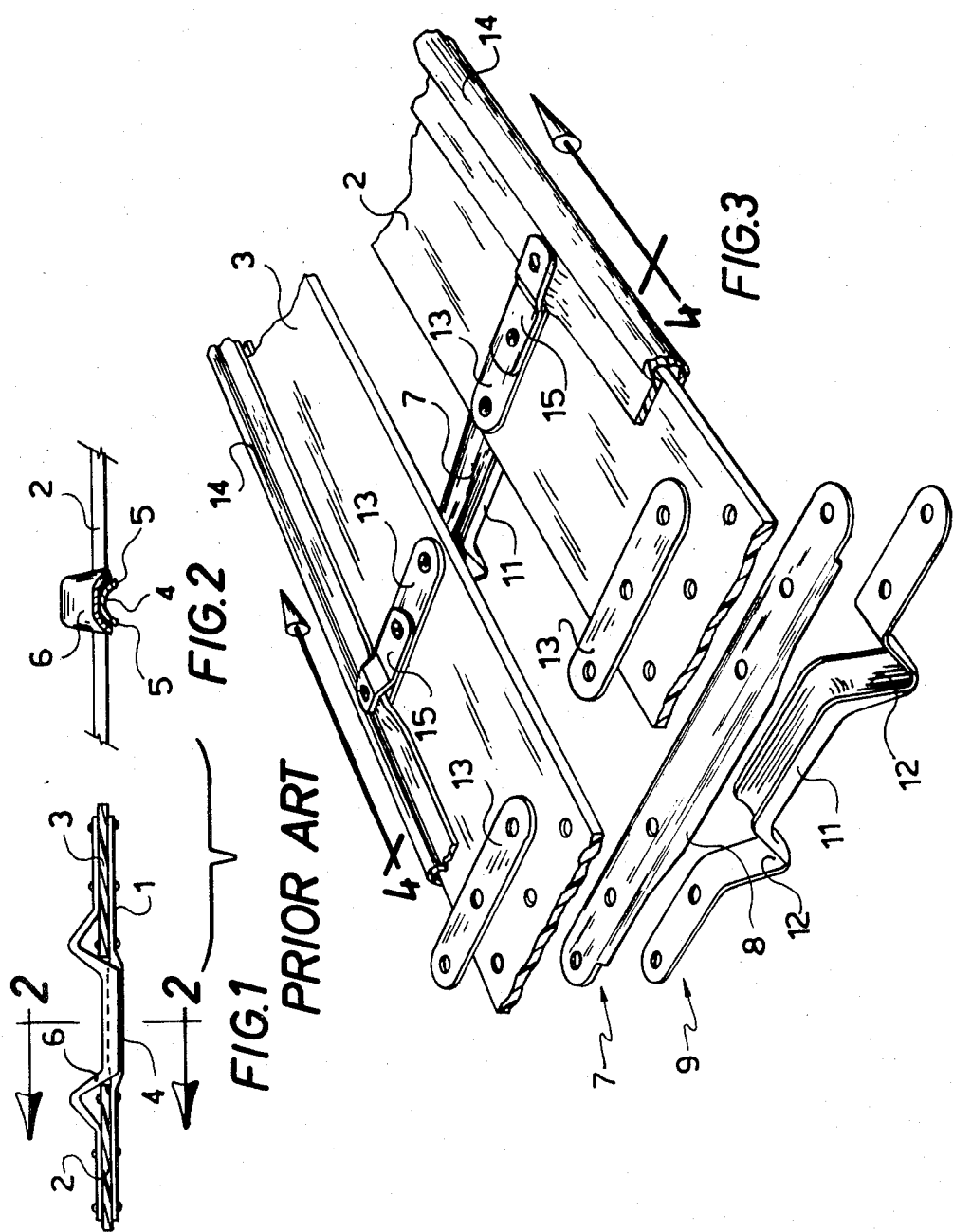

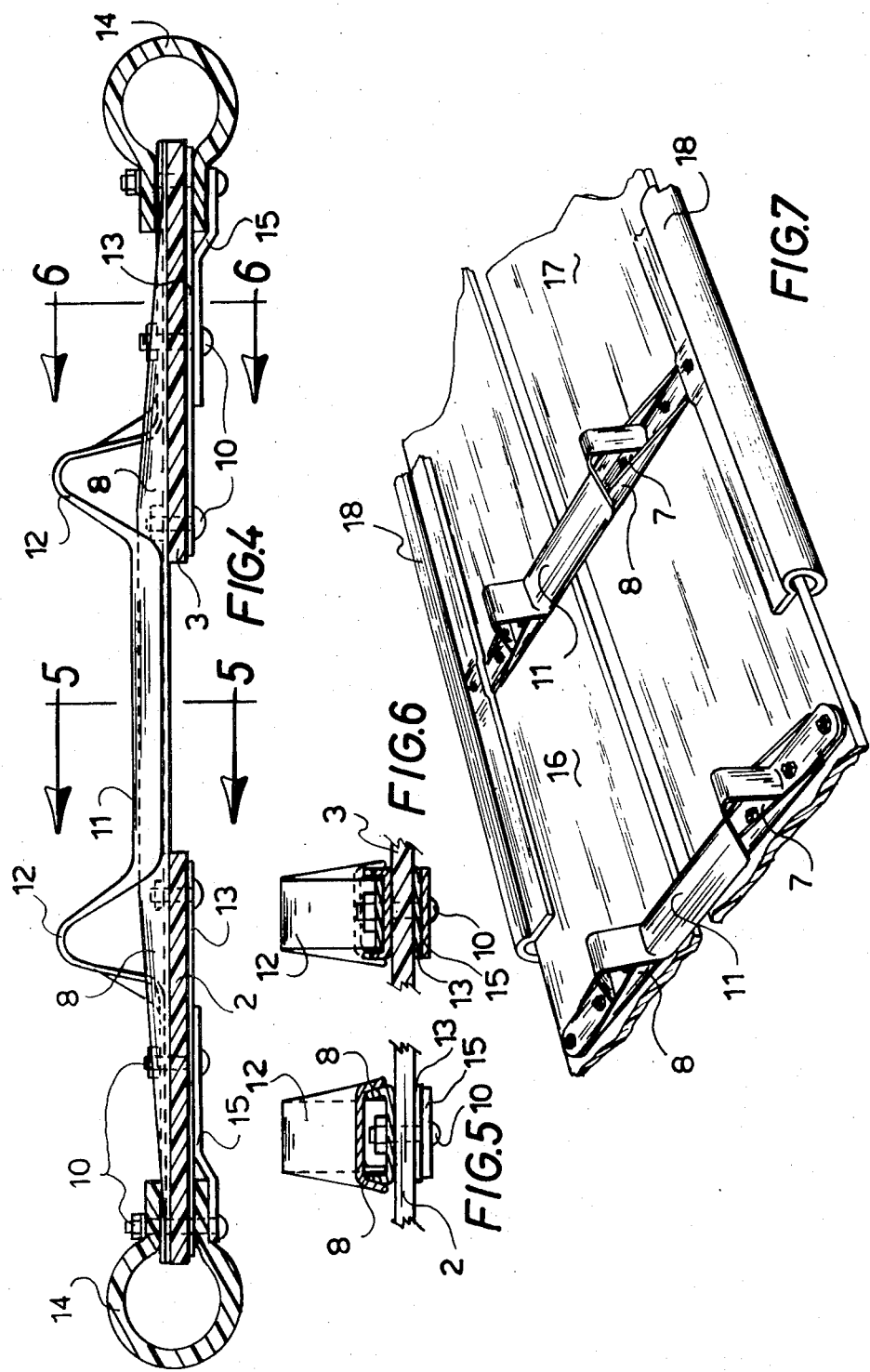

TUNDRA TRACK FOR A TRACKED VEHICLE

This invention relates to a track for a tracked vehicle, and more particularly to a track of the type which is adapted to preserve a soft ground which is travelled thereon.

The tundra defines a cold region ground covered with an easily damaged and shallow layer of vegetation which took years to form and hardly regenerates after destructive damage thereto. The use of tracked vehicles on the tundra is limited by the long lasting damage it may cause thereto. The relatively recent opening of the North to exploration has resulted in a more pressing need for a satisfactory track and many vehicle track concepts have been proposed having for object to more adequately adapt the tracked vehicles for reasonable tundra operation.

It is a general object of the invention to provide a track which is adapted for tundra operation while also having a good performance on hard ground.

It is a more specific object of the invention to adapt the endless track of the grouser bar type for satisfactory tundra operation while preserving the rigidity of the wheel load transmitting assemblies to produce a versatile track with regard to soft and hard grounds operations.

It is a further object of the invention to provide a track for a tracked vehicle including a pair of spaced apart endless belts and only shallow devices against the outer side thereof wherein the shallow devices are confined within the width of each endless belt to prevent undue sinking thereof into soft ground.

It is a still further object of the invention to provide a track for a tracked vehicle including wheel load transmitting assemblies spaced apart from each other along endless belts arranged on the inner side of the latter, and providing substantially the same rigidity as when grouser bars are used.

It is still another object of the invention to provide a track for a tracked vehicle comprising spaced apart endless belts and wheel load transmitting members extending across the intermediate space between the belts on the inner side of the latter and having a central portion of smooth transverse cross section outwardly facing toward the intermediate space to minimize the possibility of shearing engagement of that portion with the tundra.

It is another object of the invention to provide a track for a tracked vehicle comprising spaced apart endless belts and hem or edge belts secured to the outer edges of the endless belts and arranged to minimize ground damage by those outer edges such as upon steering the vehicle.

The above and other objects of the invention will become more readily understood in the light of the following detailed descriptions of preferred embodiments thereof which are illustrated, by way of example only, in the accompanying drawings, in which:

FIG. 1 is a cross-sectional view of a track for a tracked vehicle illustrating a conventional grouser bar and wheel guide assembly as known in the prior art.

FIG. 2 is a cross-sectional view of the prior art assembly of FIG. 1 as seen along line 2—2 in the latter.

FIG. 3 is a perspective, partly exploded, and partial view of a track according to a first embodiment of the invention.

FIG. 4 is a cross-sectional view as seen along line 4—4 in FIG. 3.

FIGS. 5 and 6 are cross-sectional views as seen along lines 5—5 and 6—6 respectively in FIG. 4.

FIG. 7 is a perspective and partial view of a track for a tracked vehicle according to a second embodiment of the invention.

The endless track of FIGS. 1 and 2 illustrates an old concept wherein a grouser bar 1 is secured against the outer side of a pair of laterally spaced apart belts 2 and 3. The grouser bar 1 forms a thicker central portion 4 projecting outer most from that outer side to provide the desired traction by digging to some extent into the ground. For that purpose, as may be seen in FIG. 2, the central portion 4 is formed with outwardly projecting lateral edges 5 to enhance the grip thereof. A wheel guide member 6 extends transversely of the belts 2 and 3 in superposed relationship with the grouser bar 1. The latter and the wheel guide member 6 cooperatively form a wheel load transmitting assembly of predetermined rigidity to transmit and spread the load of the tracked vehicle onto the ground.

It must be noted that in the above-mentioned prior art construction, the grouser bar is purposely constructed and arranged on the outer side of the endless belts 2 and 3 to sink to some extend into softer grounds to thereby produce traction.

The track for a tracked vehicle according to the first embodiment of the invention is shown in part in FIGS. 3 to 6 inclusive, and includes the pair of endless belts 2 and 3 arranged in laterally spaced apart relationship defining a longitudinal space between them. Load distributing members or bars 7 are secured against the inner side of the belts 2 and 3 and extend transversely thereof in laterally spaced apart relationship. It must be noted that the load transmitting members or bars 7 extend across the longitudinal space between the pair of belts 2 and 3. The load distributing bars 7 have each a smooth face resting against the inner side of the belts 2 and 3. The opposite lateral edges 8 of the load distributing bars 7 are curved or bent inwardly of the track and away from the belts 2 and 3 to reinforce the same bars, and make them suitable to transmit and spread the wheel loads.

A wheel guide bar 9 is secured in superposed registry against the inner face of each load distributing member 7. The opposite ends of each wheel guide bar 9 are secured by bolts 10 between the curved or bent edges 8 of the corresponding load distributing member 7. The intermediate portion 11 of each wheel guide bar forms a deep dent or bulge which extends across the longitudinal space between the belts 2 and 3 and which has a transverse U shape cross section forming an opening into which engages the central portion of the associated load distributing member 7. As shown in FIGS. 4 and 5, the above mentioned central portion laterally encloses the aforementioned opening and defines a smooth transverse outline projecting outwardly of that opening such that if the track sufficiently sinks into a soft ground, no sharp edge of neither of the bars 7 and 9 will engage the ground in a damaging manner. As is well known, the raised portions 12 laterally guide the track relative to the load-carrying wheels of the vehicle.

A backing plate 13 of shallow or thin construction is secured in superposed registry with each end of each load distributing bar 7, against the outer side of the corresponding belt 2 or 3, by the bolts 10. As shown in FIGS. 4, 5, and 6, the heads of the bolts 10 are of smooth contour and the plates 13 are shallow to prevent producing deep shearing impression into soft ground such as on the tundra. Besides, each backing plate 13 extends transversely of the track, lengthwise within the width of the corresponding belt. Therefore upon sinking into soft ground, there is no portion of those plates which projects across the above mentioned longitudinal space and shearing of the ground is thus reduced. The backing plates sink into relatively soft ground and the belts then bear into engagement with the latter thus producing impressions of minimized depth and shearing.

The aforedescribed first embodiment of the invention may also include some sort of hem or edge belt 14 secured along the outer edge of each belt 2 and 3. Each hem belt 14 extends for instance uninterruptively of the belts and is constituted of a strip folded around the corresponding outer edge and having its opposite lateral edges secured against the opposite sides respectively of the associated belt. Clamping plates 15 hold the outer edge of the hem belts 14 against the exterior face of the backing plates 13 and are secured by bolts 10.

The track according to the second embodiment of the invention, is solely illustrated by FIG. 7 and includes a pair of belts 16 and 17 arranged in closer spaced apart relationship than the belts 2 and 3. This may be seen by comparing the longitudinal space between the belts 2 and 3 and the belts 16 and 17. In this enbodiment as in the first, the wheel load transmitting assemblies include each the load distributing member 7, the wheel guide bar 9, and the pair of backing plates 13.

The narrower longitudinal space between the belts 16 and 17 is provided to allow escape of mud, snow, or the like between the belts from the inner side thereof.

Hem or edge belt sections 18 of any desired length are preferably secured along each outer edge of each belt 16 and 17 and are endwise spaced from each other longitudinally of the belts. Each hem or edge belt section 18 may for instance overlap two or more wheel load transmitting assemblies although only one is overlapped in FIG. 7. Obviously, either a continuous edge belt 14 or edge belt sections 18 may be used with either embodiment of the invention and the clamping plates 15 may be dispensed with.

It will be readily understood that the edge belt or edge belt sections are used to minimize shearing or scraping of the ground by the outer edges of the track upon steering the associated tracked vehicle.

What I claim is:

1. A track for a tracked vehicle comprising a pair of belts extending lengthwise in laterally spaced apart relationship and defining a longitudinal space intermediate each other, a plurality of load distributing members each having a flat face secured against the inner side of said belts and extending transversely of the latter across said longitudinal space, wheel guide means secured onto each of said load distributing members against the opposite face thereof relative to said flat face and defining a wheel path in superposed registry with said longitudinal space, and a plurality of devices exclusively arranged on the outer side of said belts against the latter, laterally confined within the width of each of said belts, and constituting shallow and smooth contoured elements each held in superposed registry with one of said load distributing members allowing said belts to bear onto relatively soft grounds.

2. A track for a tracked vehicle as defined in claim 1, wherein said wheel guide means constitute transverse bars each including an intermediate portion extending across said longitudinal space and having a transverse U-shaped cross-section defining an opening facing outwardly toward said longitudinal space, and each of said load distributing members defines a central portion engaging into said opening and closing the latter on the side of said longitudinal space and forming a smooth transverse outline projecting outwardly of said intermediate portion.

3. A track for a tracked vehicle as defined in claim 2, wherein said central portion forms a transverse U-shaped cross-section arranged with the open side facing inwardly into said opening.

4. A track for a tracked vehicle as defined in claim 3, wherein said devices include shallow backing plates secured flat against said outer side of said belts within the width of each of the latter.

5. A track for a tracked vehicle as defined in claim 4, further including a hem belt secured along each outer edge of said pair of belts and forming a bulge outwardly extending along the same.

6. A track for a tracked vehicle as defined in claim 5, wherein each of said load distributing members includes lateral edges curved away from the inner face of said belts and the opposite ends of a corresponding transverse wheel guide bar are secured between said lateral curved edges and are restrained by the latter longitudinally of said belts.

7. A track for a tracked vehicle as defined in claim 6, wherein said hem belts constitutes a strip folded around said outer edges with the opposite lateral edges of the strip secured against the opposite sides of the corresponding belt of said pair of belts.

8. A track for a tracked vehicle as defined in claim 7, further including a plurality of said hem belts secured in spaced apart relationship lengthwise of said pair of belts.

9. A track for a tracked vehicle as defined in claim 7, further including clamping plates arranged in superposed registry with said load distributing member and clamping said hem belts to said pair of belts.

* * * * *